(12) United States Patent
Yao et al.

(10) Patent No.: US 7,747,161 B2
(45) Date of Patent: Jun. 29, 2010

(54) CAMERA WITH EXTERNAL FLASH UNIT

(75) Inventors: Hsuan Yao, Taipei Hsien (TW); Hai-Tao Deng, Shenzhen (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 265 days.

(21) Appl. No.: 11/967,016

(22) Filed: Dec. 29, 2007

(65) Prior Publication Data

US 2009/0103912 A1    Apr. 23, 2009

(30) Foreign Application Priority Data

Oct. 22, 2007   (CN) .................. 2007 1 0202184

(51) Int. Cl.
    *G03B 15/03* (2006.01)
(52) U.S. Cl. ....................................... 396/176; 396/198

(58) Field of Classification Search ................. 396/176, 396/197, 198; 348/371
See application file for complete search history.

(56) References Cited

U.S. PATENT DOCUMENTS

| 5,028,943 | A | 7/1991 | Ishii et al. |
| 5,913,083 | A * | 6/1999 | Allen .......................... 396/176 |
| 6,709,120 | B2 * | 3/2004 | Lu et al. ........................ 362/16 |
| 2005/0157207 | A1 * | 7/2005 | Voss et al. .................. 348/371 |

FOREIGN PATENT DOCUMENTS

CN          2107030 U      6/1992

* cited by examiner

*Primary Examiner*—Rodney E Fuller
(74) *Attorney, Agent, or Firm*—Jeffrey T. Knapp

(57) ABSTRACT

A camera includes a frame and a flash unit. The frame is provided with a first retainer and a second retainer at two different places thereof. The flash unit is alternatively attached to the two places via one of the first retainer and the second retainer.

14 Claims, 6 Drawing Sheets

CAMERA WITH EXTERNAL FLASH UNIT

BACKGROUND OF THE INVENTION

1. Field of the Invention

The present invention relates to cameras, and more particularly to a camera which has an external flash unit.

2. Description of Related Art

An conventional camera includes a body frame and a flash unit integrally provided on the body frame or coupled to a fixed position of the frame. Because consumers like variety, cameras with different shapes and aesthetic appearance are in high demand. However, to keep the appearance of the camera attractive, the appearance of the camera has to be changed constantly and both the body frame and the flash unit have to be redesigned and reproduced to fit for a new housing of the camera. As a result, cost in developing and manufacturing a new one of this camera is dramatically increased.

What is needed, therefore, is a camera capable of fitting for different types of housing to attain a new appearance.

SUMMARY OF THE INVENTION

A camera includes a frame and a flash unit. The frame is provided with a first retainer and a second retainer at two different places thereof. The flash unit is alternatively attached to the two places via one of the first retainer and the second retainer.

Advantages and novel features of the present invention will become apparent from the following detailed description when taken in conjunction with the accompanying drawings.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
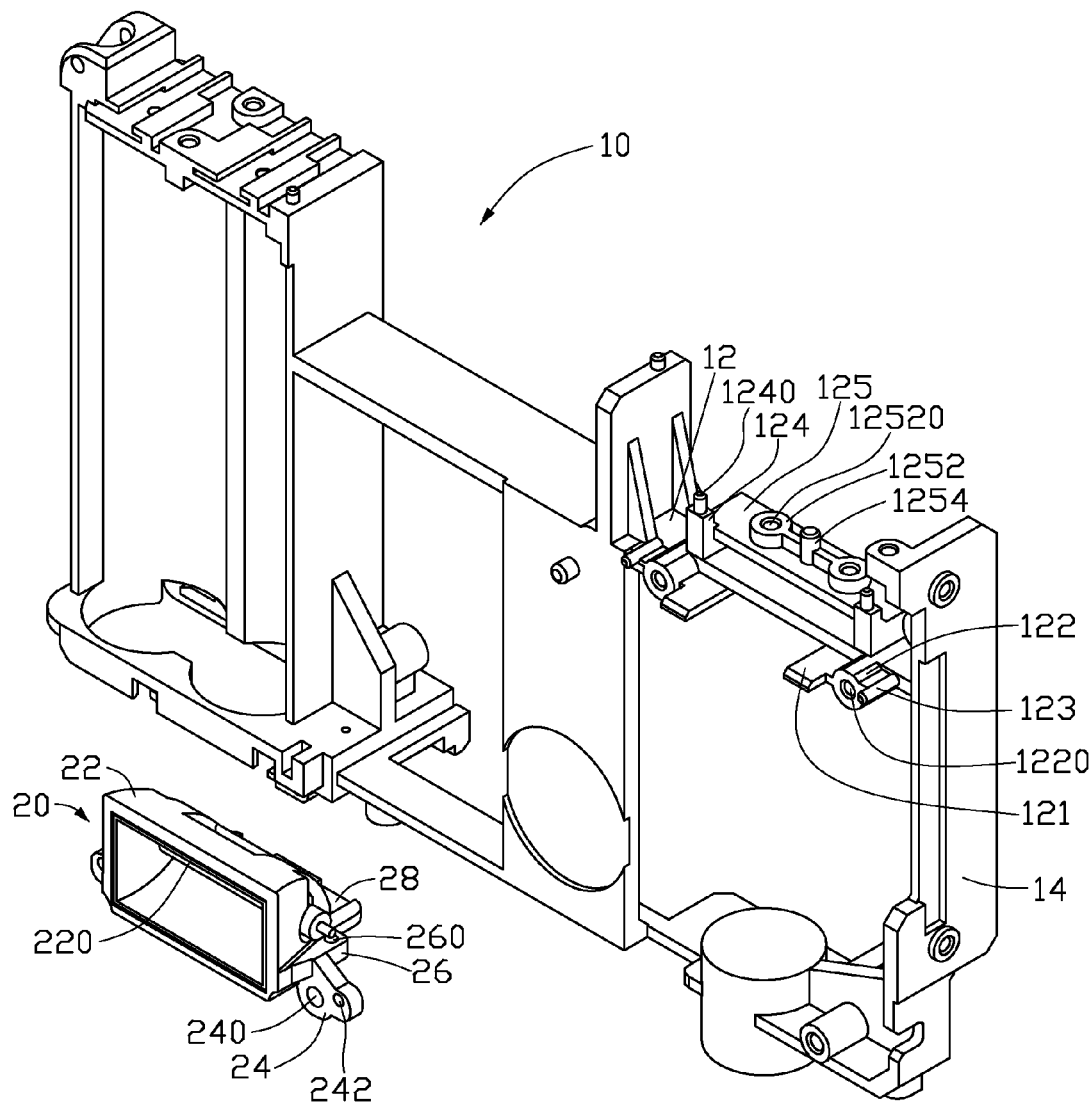
FIG. 1 is an exploded view of a flash unit and a frame of a camera in accordance with a preferred embodiment of the present invention.

Referring to FIG. 1, a camera in accordance with a preferred embodiment of the present invention includes a frame 10 and a flash unit 20. The flash unit 20 can be coupled to two different positions on the body frame 10. The two positions are perpendicularly to each other.

The frame 10 is integrally made of a light metal, or alloy such as aluminum alloy, and consists of a plurality of thin plates. The frame 10 comprises: a top panel 12 adjacent to a lateral side thereof, a bottom panel (not labeled) parallel to the top panel 12 and side walls 14 connecting the top panel 12 and the bottom panel together. The top panel 12 is provided with a first retainer at a front side thereof and a second retainer on a top thereof for alternatively mounting the flash unit 20 thereon.

The first retainer includes two spaced apart supporting plates 121, two first posts 122, the two first posts 122 joining two outer sides of the two supporting plates 121, and two first bolts 123 joining the two outer sides of the two first posts 122. The supporting plates 121, the first posts 122 and the first bolts 123 all extend forward and horizontally from the front side of the top panel 12. The two supporting plates 121 and two first bolts 123 extends to the front of and beyond the two first posts 122 and respectively sandwich the two first posts 122 therebetween. The top panel 12, the first posts 122 and the first bolts 123 are substantially leveled with each other and slightly higher than the supporting plates 121. The first posts each 122 define a first fixing hole 1220 therein for engaging with a screw to hold the flash unit 20 on the supporting plates 121.

The second retainer located on the top of the top panel 12 includes two spaced protrusions 124, a mounting plate 125 supported on the protrusions 124, two second bolts 1240 extending upwardly from the two protrusions 124, two second posts 1252 and a restricting post 1254 extending upwardly from a top surface of the mounting plate 125. The mounting plate 125 is rectangular and parallel to the top panel 12. The protrusion 124 is strip-shaped, extends in a direction perpendicular to the front side of the top panel 12 and separating the mounting plate 125 from the top panel 12. The second bolts 1240 located in front of the mounting plate 125 extend vertically from a front portion of the protrusions 124 and beyond the mounting plate 125. The two second posts 1252 are spaced apart from each other and each define a second fixing hole 12520 therein for engaging with a screw to hold the flash unit 20 on the mounting plate 125. The restricting post 1254 is located between the two second posts 1252 and extends upwardly and beyond the second posts 1252. The restricting post 1254 and the two second posts 1252 are connected to each other by two connecting portions (not labeled).

Figure 2:
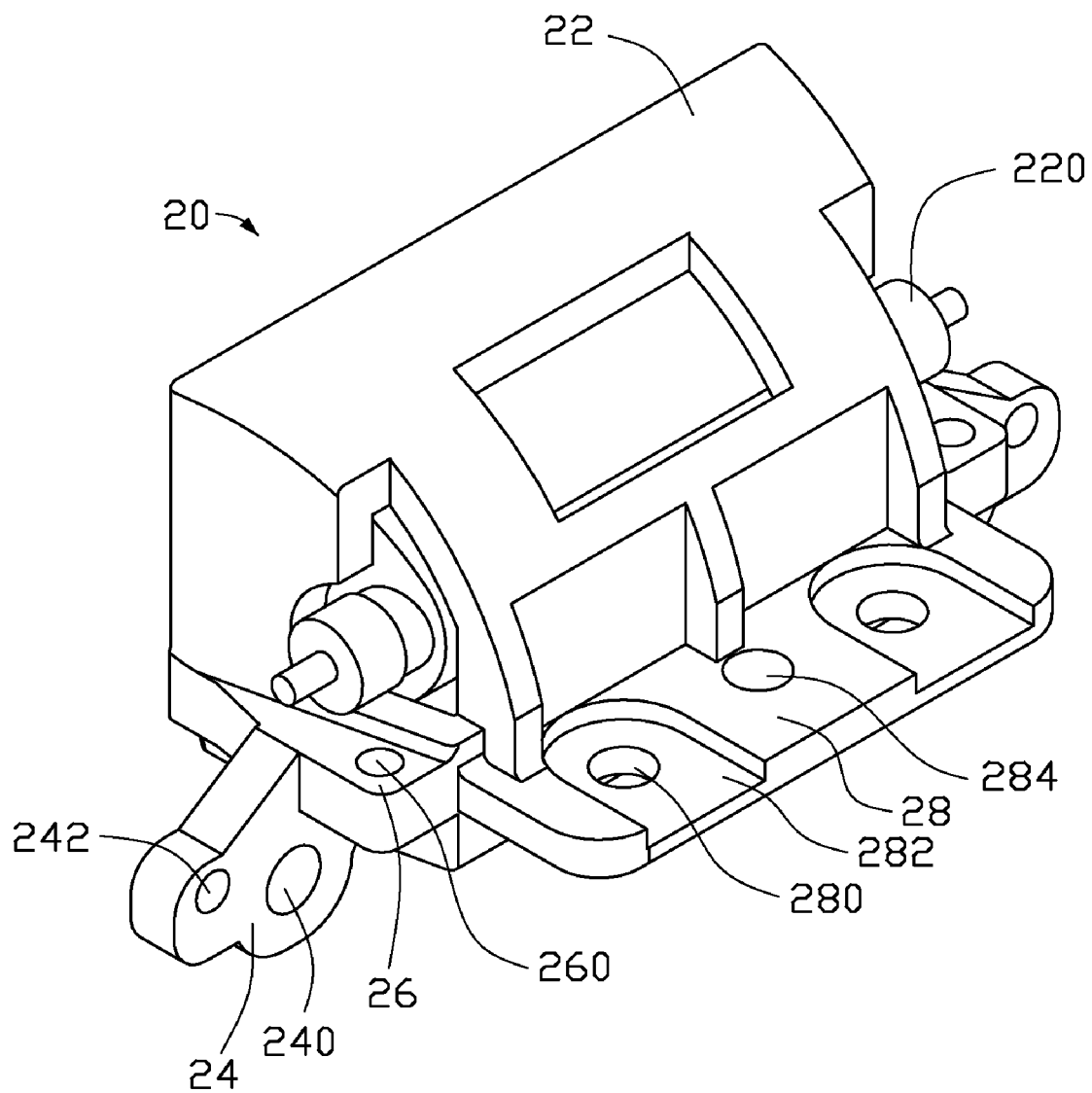
FIG. 2 is a rear view of the flash unit of FIG. 1.

As shown in FIG. 2, the flash unit 20 comprises a housing 22 and a light tube 220 installed in the housing 22. The housing 22 has two fixing ears 24 extending vertically from two opposite lateral sides thereof, two fixing flanges 26 extending horizontally from the two opposite lateral sides thereof and a fixing plate 28 extending horizontally from a rear side thereof. Each of the fixing ears 24 defines a first locking hole 242 therein adjacent to a distal end thereof for receiving the first bolt 123 of the frame 10 and a first through hole 240 therein adjacent to the housing 22 for allowing the screw extending through to screw into the first fixing hole 1220 in the first post 122 of the frame 10. Each of the fixing flanges 26 joins with an upper portion of the corresponding fixing ear 24 and defines a second locking hole 260 in a corner adjacent to a rear side thereof for receiving the second bolt 1240 of the frame 10. The fixing plate 28 defines two spaced apart second through holes 280 therein respectively adjacent to two opposite lateral sides thereof. The two through holes 280 are configured to allow two of the screws extending through to screw into the second fixing holes 12520 in the second posts 1252 of the frame 10 and a restricting hole 284 therein between the two fixing holes 280 for receiving the restricting post 1254 of the frame 10. Two substantially annular recessions 282 are formed in the fixing plate 28 respectively surrounding the two respective fixing holes 280, for accommodating heads of the screws.

Figure 3:
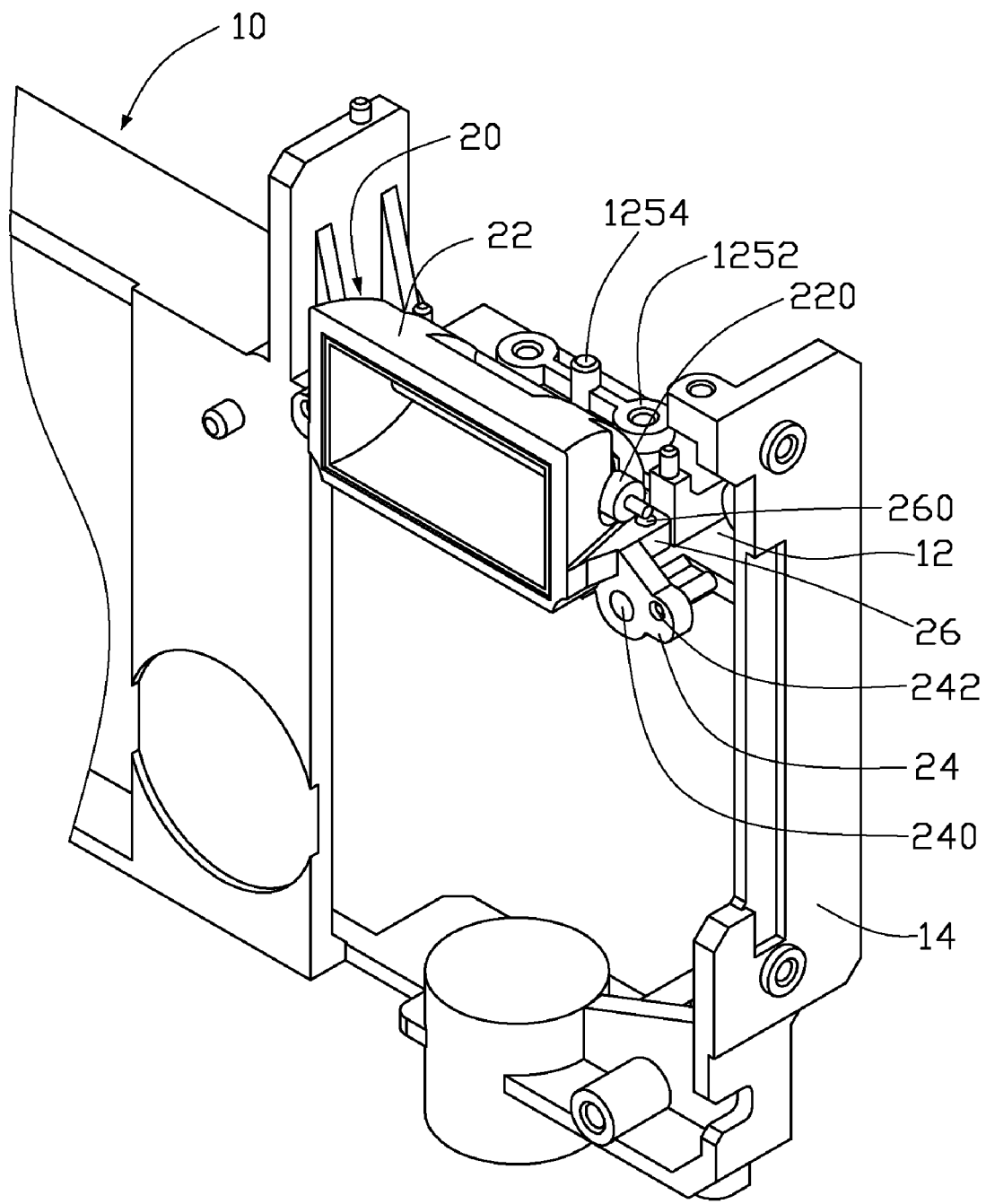
FIG. 3 is an assembled view of the flash unit secured by a first retainer of the frame of FIG. 1.
Figure 4:
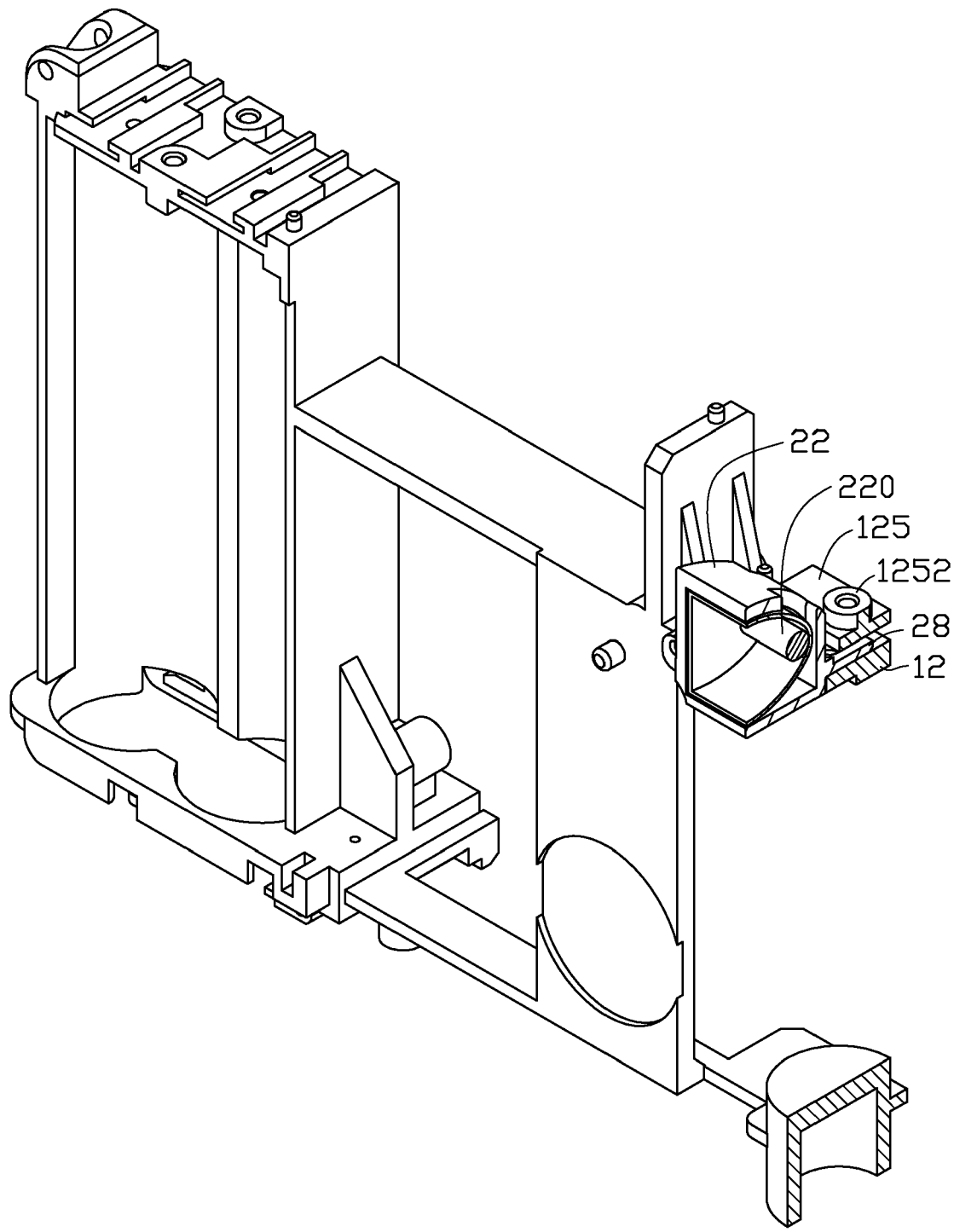
FIG. 4 is a cross section view of FIG. 3.

As shown in FIG. 3 and FIG. 4, the flash unit 20 is assembled on the frame 10 and secured in the front of the top panel 12 by the first retainer. The fixing plate 28 of the flash unit 20 is loosely sandwiched between the top panel 12 and the mounting plate 125 of the frame 10. A bottom of the housing 22 of the flash unit 20 is supported on the two supporting plates 121 in the front of the top panel 12. The two first bolts 123 are received in the two corresponding first locking holes 242 of the flash unit 20 and two of the screws extend respectively through the two first through holes 240 of the flash unit 20 to screw into the two first fixing holes 1220 in the two first posts 122 of the frame 10, the flash unit 20 is thus locked to the first retainer in the front of the top panel 12.

Figure 5:
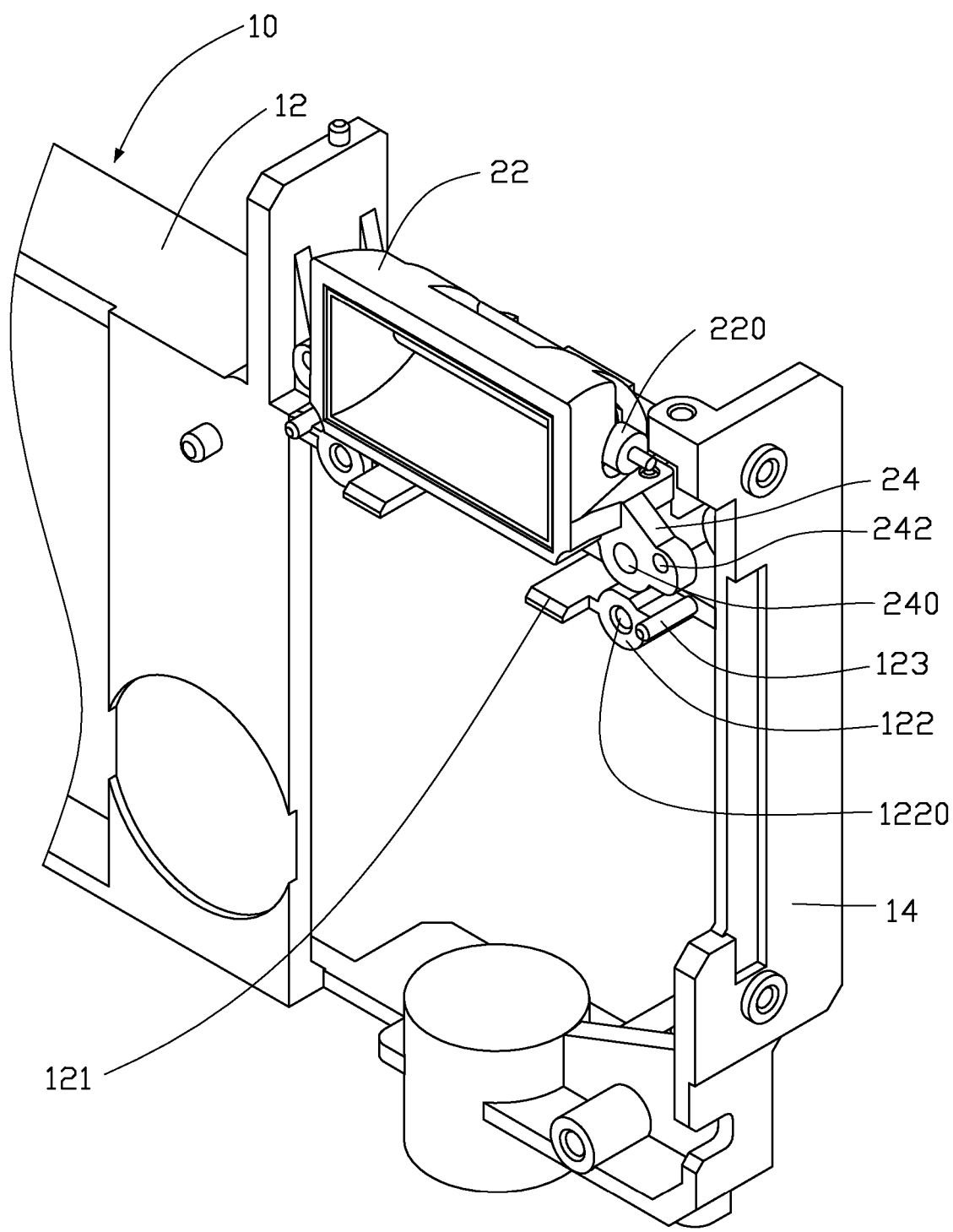
FIG. 5 is an assembled view of the flash unit secured by a second retainer of the frame of FIG. 1.
Figure 6:
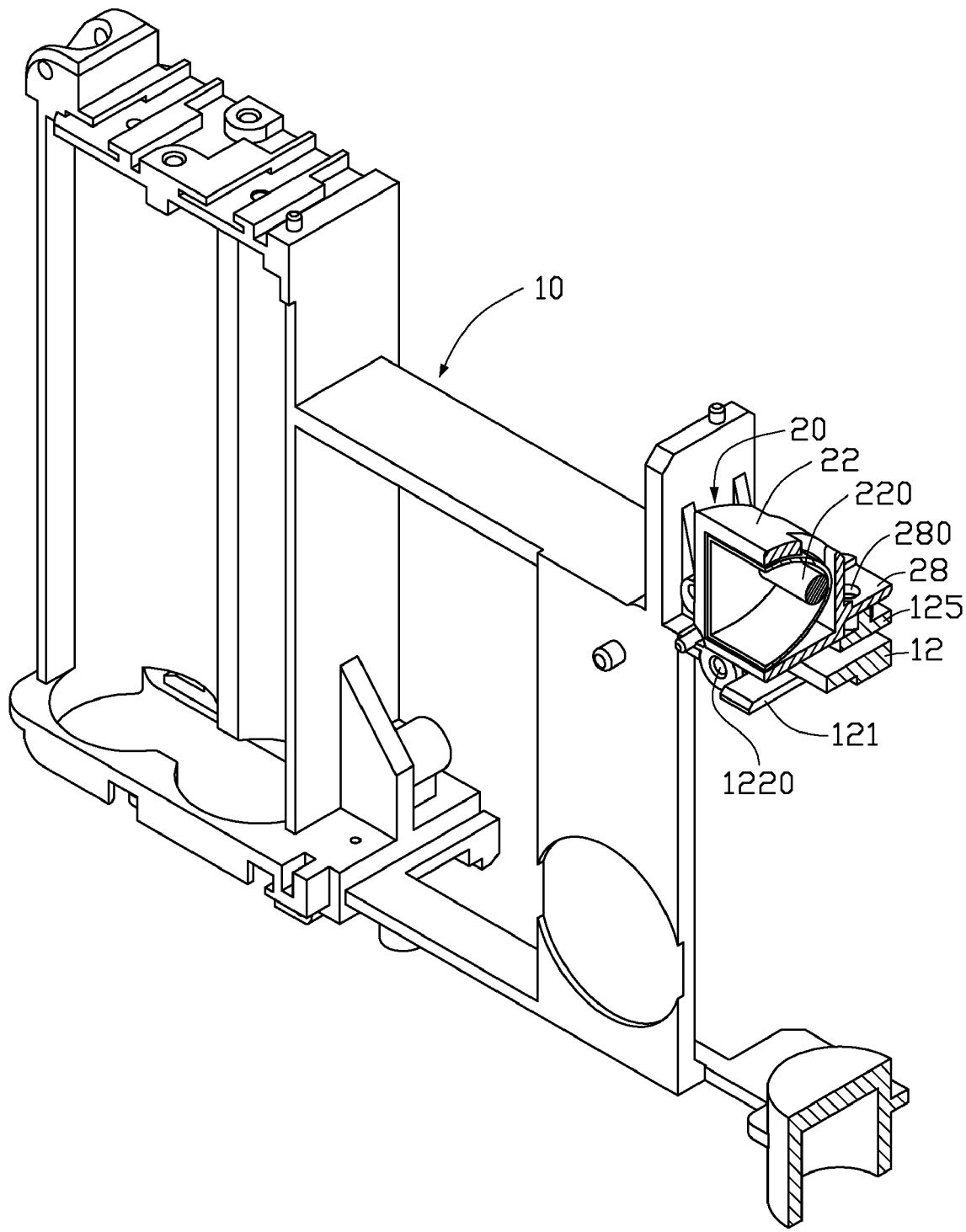
FIG. 6 is a cross section view of FIG. 5.

As shown in FIG. 5 and FIG. 6, the flash unit 20 is assembled on the frame 10 and secured above the top panel 12 by the second retainer. The fixing plate 28 of the flash unit 20 is disposed on the mounting plate 125 on the top panel 12. The restricting post 1254 on the mounting plate 125 is engaged into the restricting hole 284 in a middle of the fixing plate 28 of the flash unit 20; the two second bolts 1240 are respectively engaged into the two second locking holes 260 in two fixing flanges 26 of the flash unit 20, the flash unit 20 is thus presecured on the mounting plate 125 of the frame 10. The flash unit 20 is finally locked to the second retainer on the top panel 12 by two of the screws extending respectively through the two second through holes 280 of the flash unit 20 to screw into the two second fixing holes 12520 in the two second posts 1252 on the mounting plate 125.

According to aforementioned description, the flash unit 20 can be alternatively assembled on the frame 10 at two different oriented positions via the first retainer or the second retainer to obtain distinct advantages. For example, when the flash unit 20 is secured on the front of the top panel 12 of the frame 10, the flash unit 20 projects forward from the frame 10 to obviously increase a thickness of the camera, therefore this type of camera may not be outstanding in smart appearance for having a disagreeable thickness but may be advantage in powerful function for having an easy space. However, when the flash unit 20 is secured on the top panel 12 of the frame 10, the flash unit 20 would only project slightly, or not at all, beyond the front side of the top panel 12 of the frame 10. Thus, the camera can be transformed into different shapes and appearance, and thus does not need to be redesigned and manufactured. The camera thus is economical and has advantages in reproducing and update.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A camera comprising:
   a frame provided with a first retainer and a second retainer at two different places thereof; and
   a flash unit comprising two fixing ears and two fixing flanges, and alternatively attached to the first retainer via the two fixing ears or the second retainer via the two fixing flanges.

2. The camera as claimed in claim 1, wherein the first retainer is located at a front of the frame, the second retainer is located at a top of the frame.

3. The camera as claimed in claim 1, wherein the two different places are oriented perpendicularly to each other.

4. The camera as claimed in claim 1, wherein the frame comprises a top panel adjacent to a lateral side thereof, a bottom panel and side walls connecting the top panel and the bottom panel together, the first retainer is provided on a front side of the top panel, the second retainer is provided on a top of the top panel.

5. The camera as claimed in claim 4, wherein a mounting plate located above the top panel is parallel to the top panel and connected to the top panel by two protrusions at two opposite ends thereof.

6. The camera as claimed in claim 5, wherein the flash unit comprises a housing, two fixing ears extending vertically from two opposite lateral sides thereof and two fixing flanges extending horizontally from the two opposite lateral sides of the housing.

7. The camera as claimed in claim 6, wherein an upper portion of each of the two fixing ears joins corresponding one of the two flanges.

8. The camera as claimed in claim 6, wherein each of the two fixing ears defines a first through hole therein.

9. The camera as claimed in claim 8, wherein the first retainer includes two spaced supporting plates extending forward from the front side of the top panel and two first posts extending forward from the front side of the top panel, a fixing hole is defined in each of the first posts, the mounting plate is sandwiched between the mounting plate and the top panel, the flash unit is supported on the two supporting plates, two screws extend respectively through the two first through holes of the flash unit to screw into the two first fixing holes of the first poles.

10. The camera as claimed in claim 9, wherein the top panel is higher that the supporting plates and is level with the first posts.

11. The camera as claimed in claim 9, wherein each of the fixing ears of the flash unit defines a locking hole therein, two spaced bolts extending forward from the front side of the top panel of the frame and connected to two outer sides of the two first posts, the two bolts are engaged into the two locking holes.

12. The camera as claimed in claim 6, wherein the flash unit further comprises a fixing plate extending horizontally from a rear side thereof, and the fixing plate defines two spaced second through holes.

13. The camera as claimed in claim 12, wherein the second retainer includes two spaced posts extending upwardly from a top surface of the mounting plate, a second fixing hole is defined in each of the two second posts, two screws respectively extends through the two second through holes and are screwed into the two second fixing holes.

14. The camera as claimed in claim 13, wherein each of the fixing flanges therein defines a locking hole for receiving a bolt extending upwardly from a front portion of each of the protrusions, the fixing plate therein defines a restricting hole between the two second through holes, a restricting post extending upwardly from the mounting plate is located between the two second posts and received in the restricting hole.

* * * * *